United States Patent [19]

Takeshita

[11] Patent Number: 5,600,385
[45] Date of Patent: Feb. 4, 1997

[54] CAMERA WITH MAGNETIC RECORDING/READING DEVICE

[75] Inventor: Yukitaka Takeshita, Saitama, Japan

[73] Assignee: Fuji Photo Film Co., Ltd., Kanagawa, Japan

[21] Appl. No.: 240,578

[22] Filed: May 11, 1994

[30] Foreign Application Priority Data

May 11, 1993 [JP] Japan .................................... 5-109562

[51] Int. Cl.⁶ ............................ G03B 17/24; G03B 17/28
[52] U.S. Cl. ........................................ 396/319; 396/440
[58] Field of Search .................................... 354/106, 105, 354/203, 212; 352/92, 224

[56] References Cited

U.S. PATENT DOCUMENTS

| | | | |
|---|---|---|---|
| 5,005,031 | 4/1991 | Kelbe | 354/106 |
| 5,016,030 | 5/1991 | Dwyer et al. | 354/106 |
| 5,028,940 | 7/1991 | Pearson | 354/105 |
| 5,136,318 | 8/1992 | Aoshima | 354/105 |

FOREIGN PATENT DOCUMENTS

| | | | |
|---|---|---|---|
| 3202830 | 9/1991 | Japan | G03B 17/24 |
| 9004202 | 4/1990 | WIPO | G03B 17/24 |
| 9004201 | 4/1990 | WIPO | G03B 17/24 |
| 9006536 | 6/1990 | WIPO | G03B 17/24 |
| 9105288 | 4/1991 | WIPO | G03B 17/24 |

*Primary Examiner*—A. A. Mathews
*Attorney, Agent, or Firm*—Sughrue, Mion, Zinn, Macpeak & Seas

[57] ABSTRACT

A camera is capable of writing data into, and reading data from, a magnetic recording layer formed on photo film. An exposure chamber has a pair of inner rails along horizontal sides of an exposure aperture. Outside the inner rails, a pair of outer rails are formed. Rear faces of the inner rails receive the photo film. Rear faces of the outer rails contact the film support plate. In the film support plate, the magnetic head is mounted. The film support plate is fixed on the exposure frame, and defines a film tunnel between it and the exposure frame. The film support plate has four pins, which regulate each position of longitudinal edges of the film while moved through the film tunnel. The film is guided by the four pins on the film support plate, and is kept to have a position relative to the magnetic head, so as there to be no track deviation or azimuth deviation.

15 Claims, 8 Drawing Sheets

CAMERA WITH MAGNETIC RECORDING/READING DEVICE

BACKGROUND OF THE INVENTION

1. Field of the Invention

The present invention relates to a camera with a magnetic recording/reading device. More particularly, the present invention relates to a camera in which data is read from, and written into, a magnetic recording layer formed on photo film.

2. Description of the Related Art

Known cameras, disclosed in International Publications WO 90/04201 and 90/04202, read data from, and write data into, a transparent magnetic recording layer formed on photo film, during movement of the film. A magnetic head is used, which is disposed in a film passageway of the camera. Examples of magnetic data stored during film manufacture are the kind and sensitivity of the film, and the number of the available exposures on the film. Examples of magnetic data written in the recording layer during photography are a shutter speed, a date, magnification, and information specifying conditions in printing a photograph as instruction to photofinisher. The magnetic head is mounted on a film support plate together with a magnetic recording/reading circuit. This structure is compact and facilitates assembly.

In a conventional camera, a camera body has a hinged back door. In the camera body is formed an exposure aperture, of which the rear is an exposure frame. The exposure frame has a pair of inner rails for positioning the film in a direction of the optical axis of the camera, and a pair of outer rails for guiding longitudinal edges of the film. A film support plate or pressure plate is mounted on the back door via a spring coil or a spring plate. The outer rails closely contact the film support plate, which defines a film passageway between it and the exposure frame like a tunnel. Because it is mounted on the spring member, the film support plate is shiftable in the direction of the optical axis of the taking lens and vertically with respect to the film. The film support plate is shiftable also in the direction of the vertical optical axis, only to a smaller extent. Also, it is known to use a film support plate mounted directly on a camera body by a spring.

To allow smooth movement of the film, the interval between the outer rails is slightly greater than a width of the film. The film thus tends to be off-center between the outer rails during movement, and leans on either one of the outer rails. Even when the magnetic head is positioned accurately, the relative position of the film to the magnetic head tends to change. Even if precision is raised in mounting the magnetic head on the film support plate, the relative position of the film to the magnetic head also tends to change, due to the shift of the film support plate from the camera body. Therefore the magnetic head fails to trace a track of the recording layer accurately. Accordingly, errors in reading and writing data are common. Occasionally the film moves in a zigzag fashion within the film passageway, and the film support plate moves irregularly in a direction of the width of the film. Those cause azimuth deviation of the magnetic head. The photo film has a thickness much greater than audio or video magnetic tape, and has greater rigidity and curling tendency, so that track deviation and azimuth deviation are created to all the greater extent.

Simple resolution of such track deviation could be made by the use of a magnetic head having an enlarged width as compared with a width of the recording layer. However, even such a widened magnetic head cannot cope with azimuth deviation, created by the film moved in zigzag fashion within the film passageway, or by the film support plate moved irregularly in a direction of the width of the film.

Known devices for preventing track deviation and azimuth deviation are disclosed in International Publications WO 90/06536 and WO 91/05288 and JP-A (Japanese Patent Laid-Open Publication No. 3-202830). In those documents, mechanisms for supporting the magnetic head and the film support plate are so improved that the magnetic head and the film support plate are caused to follow a zigzag movement of the film.

However, such a construction, causing the magnetic head or the film support plate to follow a zigzag movement of the film, requires a device for detecting the zigzag movement, a mechanism for moving the magnetic head and the film support plate, and a linking mechanism. It is inevitable that a camera with this construction is highly expensive, because the number of parts and the number of assembling processes are large. It would be conceivable to raise precision of the outer rails and to form a film passageway with a width determined accurately, while positioning pins would be formed on a film support plate, in order that the pins would position the film support plate relative to the camera body. However, the expense of manufacturing a camera with this construction is also high. This is because precision in relative position between the recording layer and a magnetic head fixed on the film support plate could not be raised, unless precision is ensured in relative position between the magnetic head and the film support plate, in position of the pins relative to the film support plate, and in position of the pins relative to the camera body.

SUMMARY OF THE INVENTION

In view of the foregoing problems, an object of the present invention is to provide a camera in which a film support plate can define a film passageway to minimize creation of track deviation and azimuth deviation.

Another object of the present invention to provide a camera that does not require complicated mechanisms.

Still another object of the present invention to provide a camera in which a magnetic head on a film support plate can be inspected for reading performance and precision in mounting position.

In order to achieve the above and other objects and advantages of this invention, a regulating device is disposed on a film support plate or film pressure plate for regulating a position of the film in a direction of a width of the film. The regulating device defines a film passageway used in movement of the film. The film passageway determines the position of the film in a direction vertical to an optical axis of the taking lens. The magnetic head is positioned with reference to the regulating device, and fixed on the film support plate.

The regulating device is constituted of at least two pins on each side, namely four pins in all, which are projected from the film support plate in a direction parallel to the optical axis of the taking lens. At least two of the four pins are used for positioning the film support plate relative to the camera body. Outer rails, like a conventional camera, are disposed to define an interval greater than the film passageway defined by the pins. When a leader of the film is advanced from a film cassette in a cassette containing chamber, the leader is moved to a take-up chamber. If the leader is moved obliquely toward the take-up chamber, the outer rails receive the film leader on their lateral faces, regulate the moving direction, and guide the leader to the take-up chamber.

It is preferable that the plural pins on one longitudinal edge of the film are columnar, and that the plural pins on the opposite longitudinal edge of the film have flat faces which contact the film. This can reduce a load applied to the film, and stabilize the film direction. Recesses are formed in the film support plate around bottoms of the pins. It is thus possible to prevent the bottoms of the pins from protruding when the pins are molded integrally with the film support plate. Should the pin bottoms protrude, the film would contact the protruded bottoms, would be partially raised from the film position determined as normal, and thus would not lie flat resulting in low precision in magnetic recording. Further, the present invention provides an opening formed in the film support plate through which a jig is inserted. For testing the reading and the mounting position of the magnetic head, a magnetic tape instead of the film is moved inside the camera while guided by the pins. The inserting opening can be utilized to allow the jig to press one longitudinal edge of the magnetic tape against the flat faces of the pins, to position the tape.

In the present invention, the film support plate with the magnetic head is provided with the regulating device, e.g., at least four pins, to define the film passageway contacting at least two positions along each longitudinal edge of the film. The film can be positionally regulated by the film support plate while the film is moved. Therefore, the magnetic head has a constant position relative to the direction of the film width, even when the position of the film support plate is deviated in relation to the camera body, either structurally or during movement of the film. It is then possible to avoid track deviation or azimuth deviation and reading data from, or writing data into, the magnetic recording layer of the film can be reliably accomplished.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
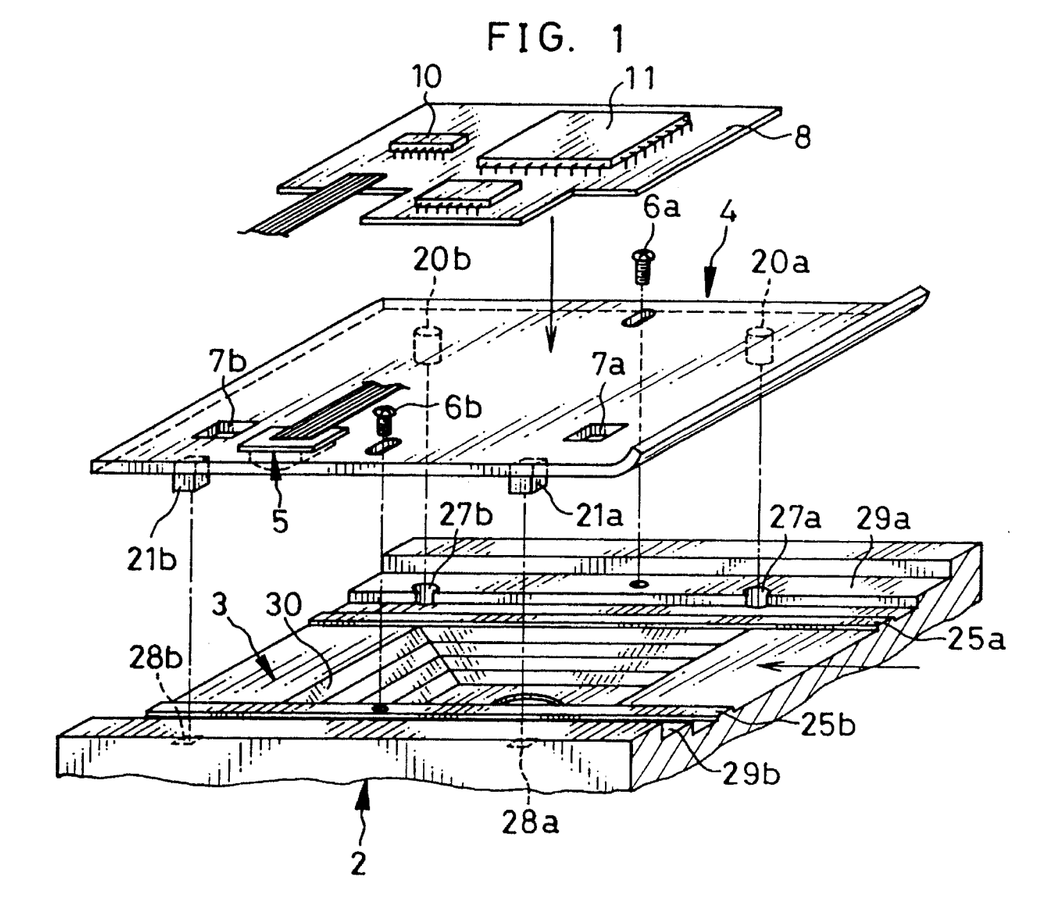
FIG. 1 is an exploded perspective view illustrating an important section of a camera according to the preferred embodiment of the present invention.
Figures 2A, 2B:
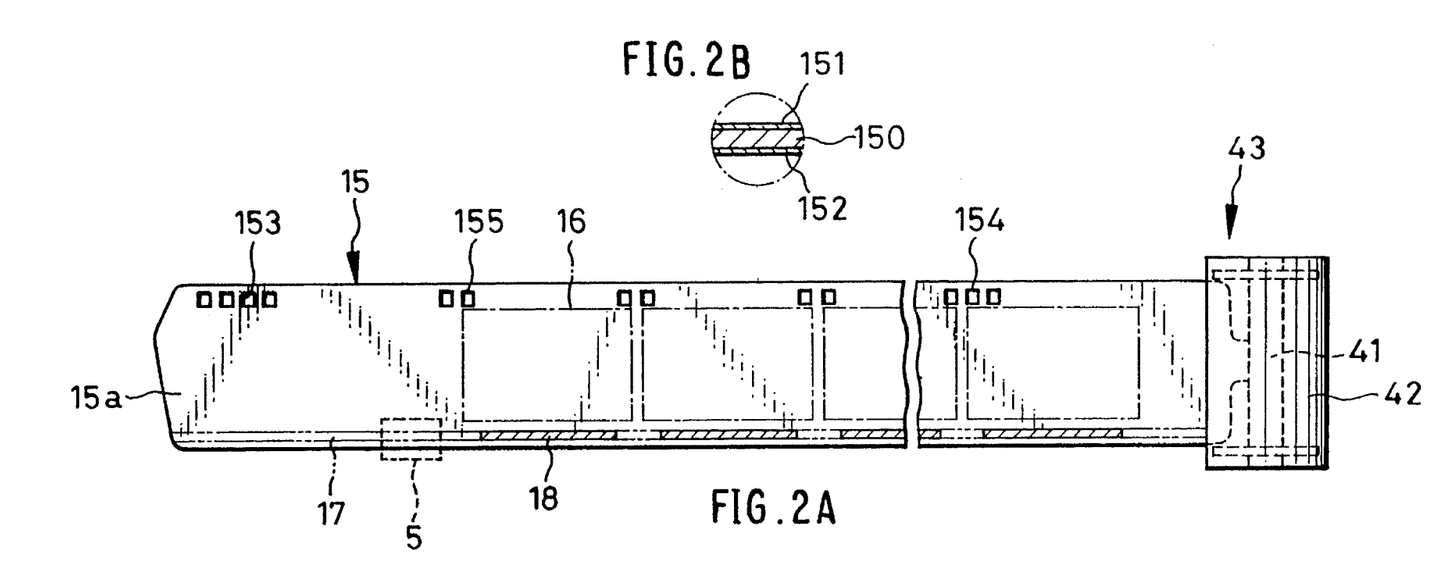
FIG. 2A is a plan view illustrating a film cassette with which the camera is loaded.
FIG. 2B is an enlarged view of the film in cross-section.

In FIG. 1 illustrating a camera of the preferred embodiment of the present invention, a camera body 2 has an exposure frame 3 defined by a rear of an exposure aperture 30. A pair of inner rails 25a and 25b are along two horizontal sides of the exposure aperture 30. Outside the inner rails 25a and 25b, there are outer rails 29a and 29b which have a greater height than the inner rails 25a and 25b. The outer rails 29a and 29b closely contact a film support plate 4, which is fixed on the exposure frame 3 by two screws 6a and 6b. Note that the film support plate 4 may be supported on springs, which may be inserted between the plate 4 and heads of the screws 6a and 6b, in order that the film support plate 4 can be biased forward and shifted to the rear upon being pressed forcibly by photo film 15 (See FIG. 2). Alternatively, four screws may be used for fixing the film support plate 4 on the exposure frame 3.

The film support plate 4 defines a film tunnel between it and faces of the outer rails 29a and 29b, to allow the film 15 to pass therethrough. The film support plate 4 is molded from plastics, contacts the back surface of the film 15, and serves to keep the film 15 flat.

The magnetic head 5 is fitted in an opening in the film support plate 4 from the rear. The position of the magnetic head 5 relative to pins 21a and 21b is precisely determined, before the magnetic head 5 is fixed on the plate 4 by use of an adhesive agent. The film support plate 4 is provided with two additional openings 7a and 7b through which a jig can be inserted for the purpose of inspection of the magnetic head 5.

Behind the film support plate 4 is secured a base plate 8, with a driver IC 10, a control IC 11 and the like mounted thereon. The driver IC 10 drives the magnetic head 5. The control IC 11 controls the driver IC 10. The control IC 11 is connected to a CPU (not shown) for sequentially controlling the camera. While an exposed imaging frame is moved away after photography, the control IC 11 causes the driver IC 10 to drive the magnetic head 5.

In FIGS. 2A and 2B, a photo film cassette 43 consists of a cassette shell 42, a spool 41 rotatably contained in the cassette shell 42, and the photo film 15 having a trailer fixed on the spool 41. The entirety of the film 15 of the film cassette 43 is wound into the cassette shell 42 before use such that a leader 15a is pre-contained in the cassette shell 42. When the spool 41 is rotated, the roll of the film 15 is rotated together with the spool 41. The film leader 15a while rotated is separated by a separator claw (not shown) of the cassette shell 42 from the film roll, and is advanced to the outside through a slot in the cassette shell 42.

The photo film 15 consists of a base 150 having transparency to light, a photosensitive emulsion layer 151 formed thereon, and magnetic recording layer 152 in opposition to the emulsion layer 151. The recording layer 152 is formed by application of a thin coating of magnetic material. The film leader 15a has perforations 153 to be engaged with plural claws (not shown) arranged around a take-up spool of the camera, and a final perforation 154 for signaling information of the film trailer. Perforations 155 are so formed that each pair is associated with a single imaging frame. Those perforations 155 are detected by a photo sensor of the camera, and cause the camera to determine the frame-by-frame amount of the film movement in a known manner. Note that the one-dot-chain lines indicate imaging frames 16. The two-dot-chain lines indicate a recording track, namely area where the magnetic head 5 contacts the magnetic recording layer 152. The hatched portions indicate data-recording areas 18 where the data is written.

Figure 3:
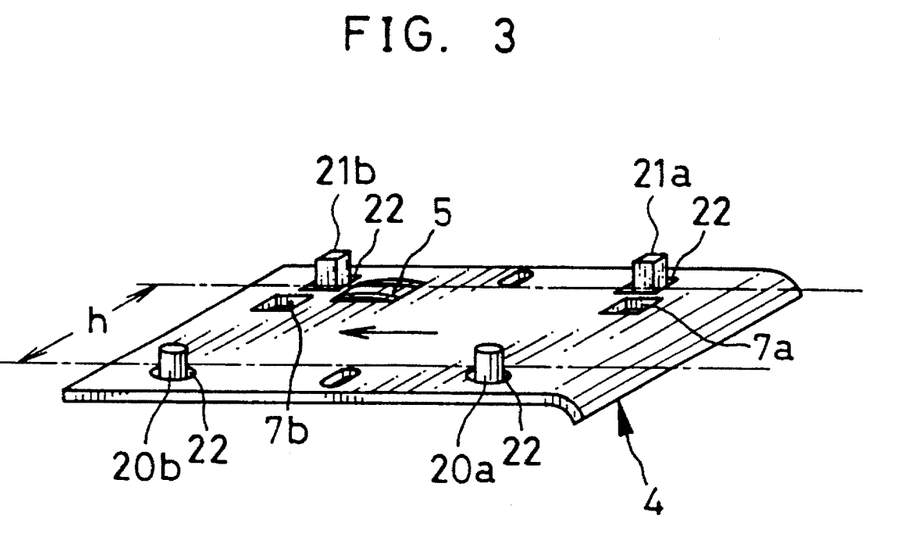
FIG. 3 is a perspective illustrating a film support plate.

FIG. 3 illustrates the front of the film support plate 4, on which two columnar pins 20a and 20b having a cylindrical shape, and the two rectangular pins 21a and 21b, are all formed integrally with the plate 4. The pins 20a and 21a are arranged to have an interval therebetween of h. The pins 20b and 21b also have therebetween the interval of h. These four pins define a film passageway, which regulates the photo film 15, while it is moved within the film tunnel, in the width direction of the photo film 15. Therefore, track deviation and azimuth deviation can be reduced because the magnetic head 5 maintains a constant position with reference to the film 15, even when the position of the film support plate 4 is deviated in relation to the exposure frame 3, either structurally or by vibration of the plate 4 during movement of the film 15. Also, precision in the size of the film passageway is raised over the conventional camera in which a film passageway being the value h wide would be defined by outer rails such as those 29a and 29b.

Figure 4:
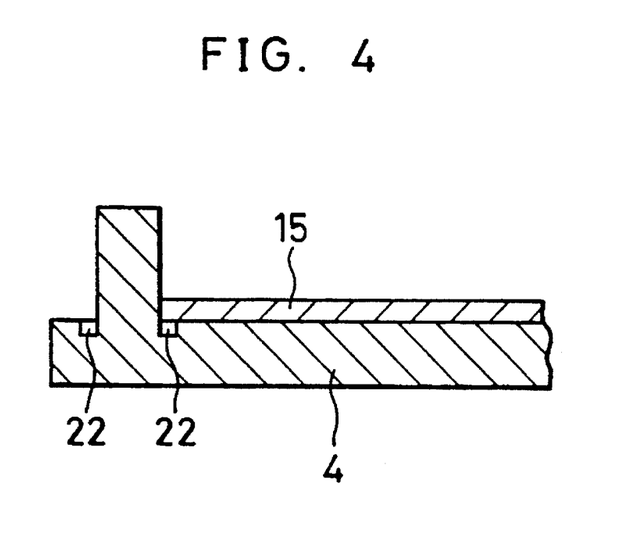
FIG. 4 is a partial section illustrating the film support plate of which pins guide longitudinal edges of the film.

In FIG. 4, recesses 22 are formed in the film support plate 4 around respective bottoms of the pins 20a, 20b, 21a and 21b. Use of those recesses 22 enables the plastic molding operation of the plate 4 to avoid the formation of protrusions, around the bottoms of the four pins, shaped as a partly conical face. Should the bottoms of those pins have protrusions of a partly conical face, the protrusions would raise the longitudinal edges of the film 15, and would hinder good contact of the magnetic head with the film 15.

Figure 5:
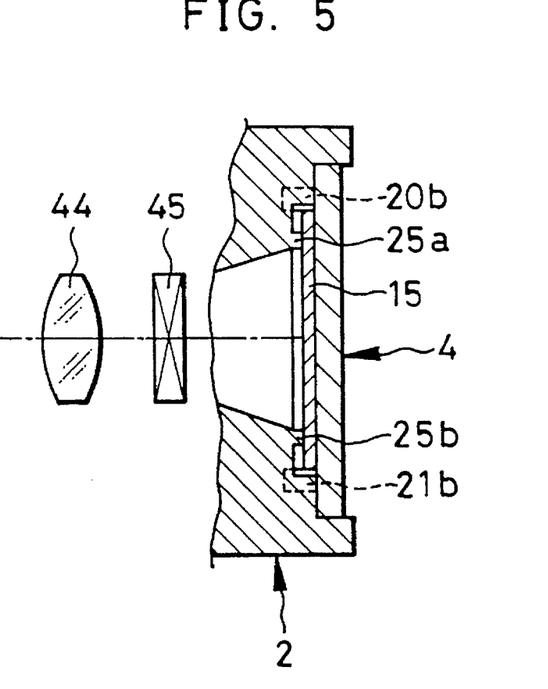
FIG. 5 is cross section illustrating the important section of the camera.
Figure 6:
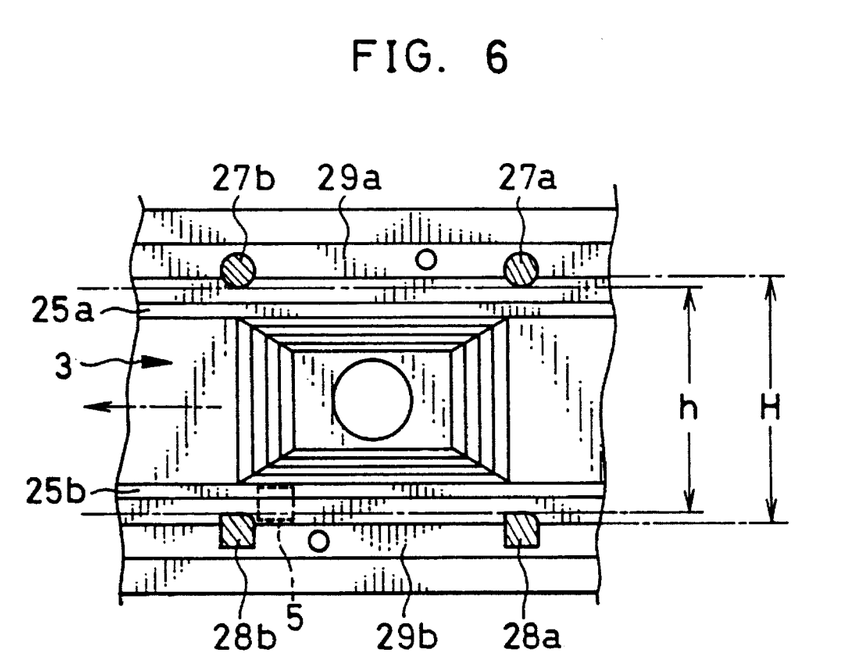
FIG. 6 is a front elevation illustrating a section having an exposure frame.

As illustrated in FIG. 5, the two inner rails 25a and 25b, arranged over and under the exposure aperture 30, support the front of the film 15, and position it in the direction of an optical axis of a taking lens 44. Outside the upper inner rail 25a, there are formed circular guide holes 27a and 27b for receiving the pins 20a and 20b, as illustrated in FIG. 6. Outside the lower inner rail 25b, there are formed rectangular guide holes 28a and 28b for receiving the pins 21a and 21b. The guide holes 27a and 27b are so formed that the pins 20a and 20b extend from the lower face of upper outer rail 29a. The guide holes 28a and 28b are so formed that the pins 21a and 21b extend from the upper face of lower outer rail 29b. Those horizontal faces of the lower rails 29a and 29b define a maximum width H of the film tunnel, and guide the film leader 15a while it is advanced upon loading the camera with the cassette 43. If the leader 15a is inclined during the advancement, the film tunnel receives and roughly regulates the film leader 15a.

Figure 7:
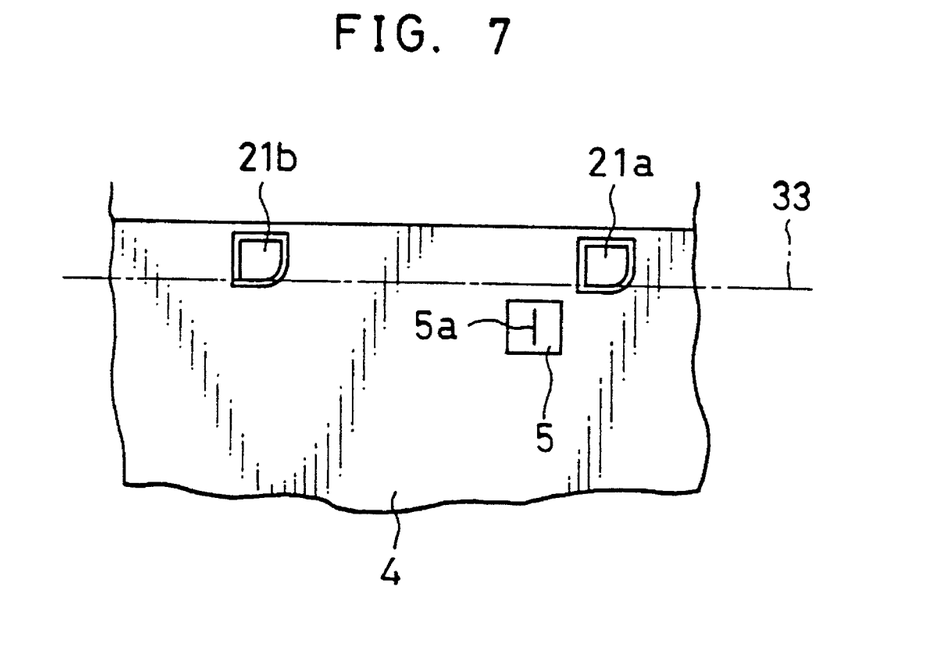
FIG. 7 is an explanatory view illustrating a relationship between a base line defined by the pins and a gap of a magnetic head.

The assembly and operation of the above embodiment is described below. The pins 20a, 20b, 21a and 21b are formed integrally with the film support plate 4 through a plastic molding operation, or the like. The magnetic head 5 is fitted into the rear of the film support plate 4 and extends through it. The position of the magnetic head 5 is properly determined and adjusted. Then the magnetic head 5 is adhered to the film support plate 4 by an adhesive agent. Then the magnetic head 5 is subjected to inspection of precision in mounting, regarding: an interval between a gap 5a of the head 5 and a base line 33 defined as a tangent of the pins 21a and 21b on the side of the film passageway, as depicted in FIG. 7; and verticalness of the gap 5a with respect to the base line 33.

Figure 8:
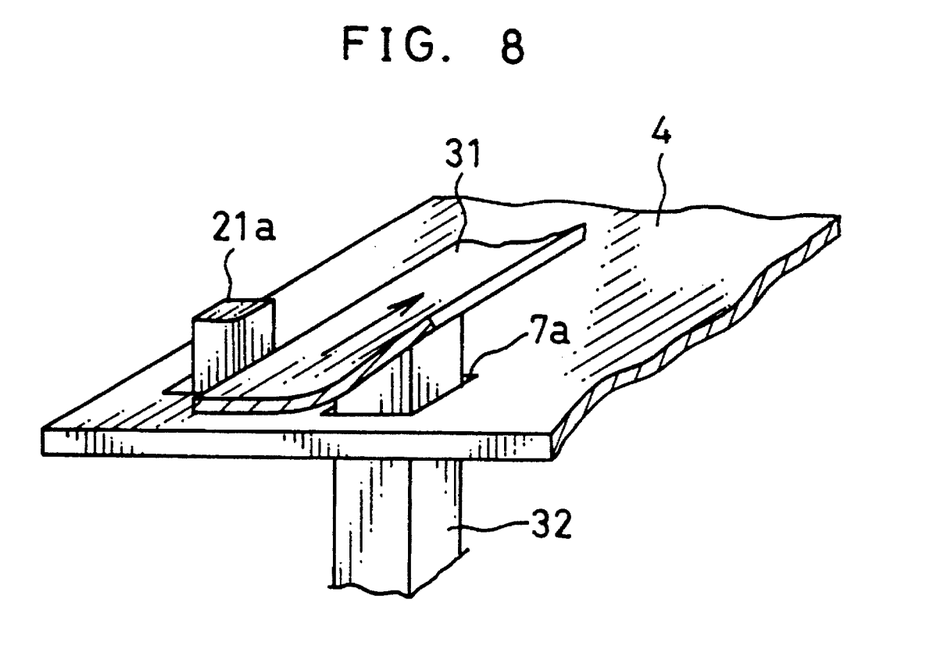
FIG. 8 is an explanatory view illustrating inspection of precision in mounting the magnetic head.

As illustrated in FIG. 8, inspecting magnetic tape 31, having a width smaller than the film 15, is placed on the film support plate 4 and along the arrangement of the pins 21a and 21b. Each jig 32 having an inclined end face is then inserted into the openings 7a and 7b. The inspecting tape 31 is pressed towards the pins 21a and 21b, which have a substantially rectangular shape, and contact the inspecting tape 31 linearly, i.e., not at a single point but over a substantial length. The pins 21a and 21b thus prevent the inspecting tape 31 from being flexed. The inspecting tape 31 is moved. A signal read from the magnetic head 5 is checked, to evaluate the mounting precision of the magnetic head 5. It thus is possible in the present invention to inspect the mounting precision of the magnetic head 5 directly before mounting of the film support plate 4 on the camera body 2, in the assemblage of the camera.

When the film support plate 4 is judged to be properly assembled, the respective pins 20a, 20b, 21a and 21b are fitted in the guide holes 27a, 27b, 28a and 28b formed in the exposure frame 3. The longer sides of the film support plate 4 are contacted on the outer rails 29a and 29b, and fixed on the exposure frame 3 by tightening the screws 6a and 6b. The pin/hole structures position the film support plate 4 suitably on the exposure aperture 30 both vertically and horizontally. In the direction of the optical axis, the outer rails 29a and 29b position the plate 4 on the exposure aperture 30. Note that at least one of the upper guide holes 27a and 27b needs to be substantially as small as the corresponding pin, but that the remaining hole may be a loose hole or cutout. At least one of the lower guide holes 28a and 28b needs to be as small as the corresponding pin, but that the remaining hole may be a loose hole or cutout. For examples, the pins 20b and 21a may be received in loose cutouts whose size is greater than the holes 27b and 28a respectively.

Figure 9:
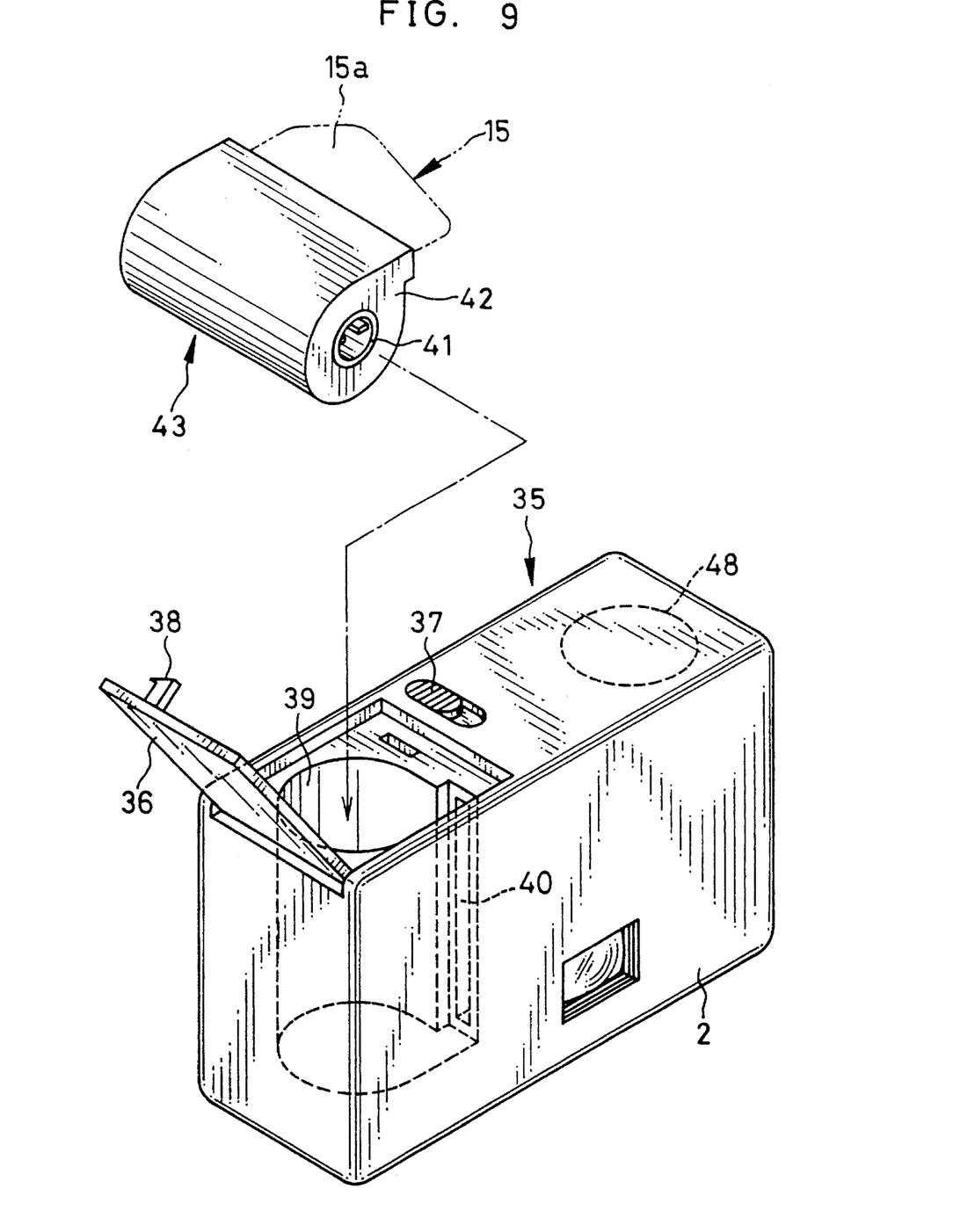
FIG. 9 is a perspective illustrating loading of the camera with film cassette.

FIG. 9 illustrates the camera 35 as oriented upside down and viewed from the rear. The bottom of the camera 35 has a bottom door 36 and a slider 37. The bottom door 36 is openable for loading the camera 35 with the cassette. The slider 37 is slidable to open the bottom door 36. When the slider 37 is slid in the position as in FIG. 9, a hook 38 is disengaged to allow opening the bottom door 36. In a cassette containing chamber 39, a gate 40 is defined by the outer rails 29a and 29b, the film support plate 4 and the exposure frame 3, and has the width H.

The photo film cassette 43 is sold with the leader 15a pre-contained in the cassette shell 42, as described above. The cassette 43 has the same state when removed from the camera 35 to be forwarded to a photo laboratory. Note that the film 15 or the film leader 15a in FIG. 9 extends out of the cassette shell 42 solely for the purpose of convenience in illustration. It is easy to insert the leader-contained cassette 43 into the cassette containing chamber 39 in a rotational axial direction. With the cassette 43 inserted, the spool 41 in the chamber 39 is connected to a fork in the chamber 39 in a known manner.

When the chamber 39 is closed, a CPU rotates a motor (not shown), which in turn rotates the fork and a take-up spool (not shown) disposed in a film take-up chamber 48. The rotation of the fork rotates the spool 41, and causes the leader 15a to advance out of the cassette shell 42 through a slot (not shown). The film leader 15a is moved through the gate 40 and into the film tunnel. Note that the distal end of the film leader 15a is projected in a V-shape to smooth movement through the film tunnel.

The film leader 15a is guided between the outer rails 29a and 29b, and comes between the opposite pins 20a and 21a.

Figure 10:
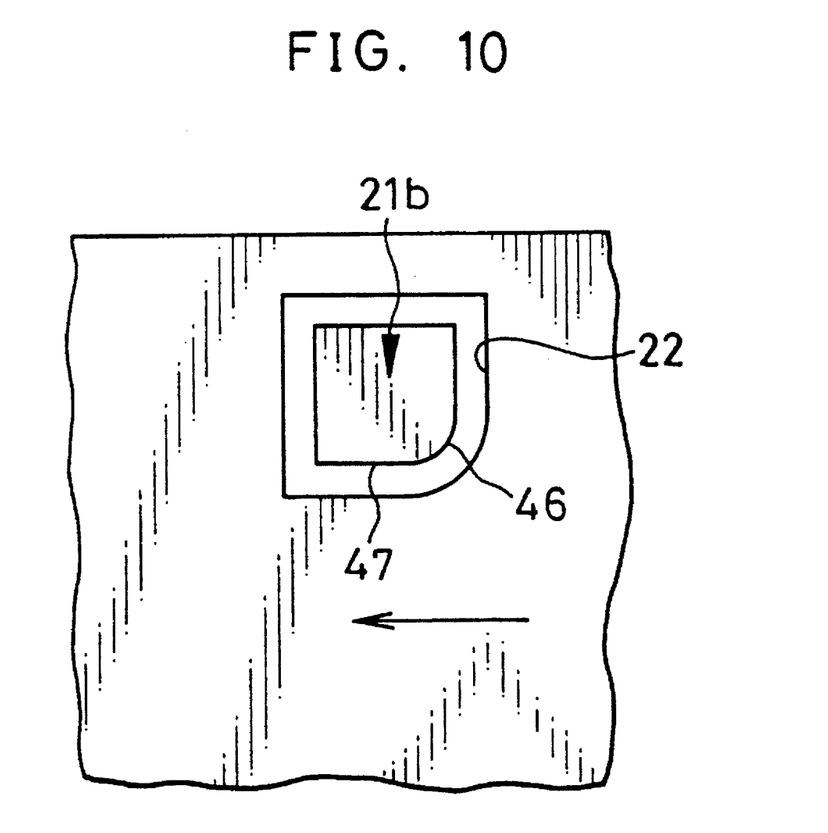
FIG. 10 is a front elevation in enlargement illustrating the pin having a flat face.

The pin 20a is cylindrical. The pin 21a has a round portion 46 and a straight portion 47. The round portion 46 is disposed before the straight portion 47 with respect to the advancement of the film 15, in the arrow-indicated direction in FIG. 10. Both round portions of the pins 20a and 21a enable the leader 15a to move smoothly without hindrance. In further movement, the leader 15a reaches the pins 20b and 21b, and moves between them smoothly without hindrance. Note that the pins 21a and 21b may otherwise have an inclined portion instead of the round portion.

When friction or the like forces the film leader 15a to shake in the width direction, the film leader 15a tends to project out of the passageway which is h wide, after passage of the pins 20a and 21a. However, the film leader 15a is guided by the outer rails 29a and 29b, and prevented from becoming jammed. The film leader 15a is securely passed between the pins 20b and 21b. Thus both longitudinal edges of the film 15 are regulated by the pins 20a, 21a, 20b and 21b, and can be positioned with high precision with respect to the film support plate 4. Note that the pins 21a and 21b have each straight portion 47, which causes the film 15 to move in a straight manner without any zigzag deviation. The movement of the film 15 is maintained straight with respect to the gap in the magnetic head 5 constantly. The magnetic head 5 is thus always caused to confront the same position in the width direction of the film 15.

The film leader 15a, when advanced as far as the take-up chamber 48, contacts a take-up spool, which, as is well-known in the art, is disposed in the chamber 48 and rotates during the film advancement. The periphery of the take-up spool has a plurality of claws, which captures the perforations 153, and winds the film 15 thereon. When a photo sensor detects the perforations 155, a motor is stopped from rotating by the CPU, to stop the initial advancement of the film 15. The first frame 16 is set behind the exposure aperture 30.

A shutter is actuated by operating a release button. As is well known, a subject image is created on the first imaging frame 16 as a latent photographic image. After photography, the motor rotates to move forward the film 15. In the film movement, the perforations associated with the second frame are detected. Responsively the second frame 16 is set behind the exposure aperture 30.

In the film movement prior to this positioning of the second frame, the CPU causes the control IC 11 and the drive IC 10 to drive the magnetic head 5. Photographing data related to the photography of the first frame 16 is thus written in the data recording area 18 beside the frame 16. Examples of the photographing data are a date of photography, exposure information, information relating to magnification, information specifying an aspect ratio at which the frame is to be printed, and information specifying a size of paper at which the frame is to be printed. Note that the magnification information is for the purpose of determining a size of an image of a person's face as recorded on the film 15, and can be a ratio between the object distance and the focal length. The aspect ratio specifying information may be e.g., panoramic or full-size.

The path of the film 15 is regulated by the film support plate 4. The relative position of the magnetic head 5 and the recording track 17 is kept unchanged, irrespective of deviation of the film support plate 4 from the camera body 2 structurally or temporarily. Therefore, data can be written reliably without track deviation or azimuth deviation. If the film 15 comes to shake in a zigzag, the pins 20a, 20b, 21a and 21b can reduce the zigzag movement to a negligible amount.

Figure 11:
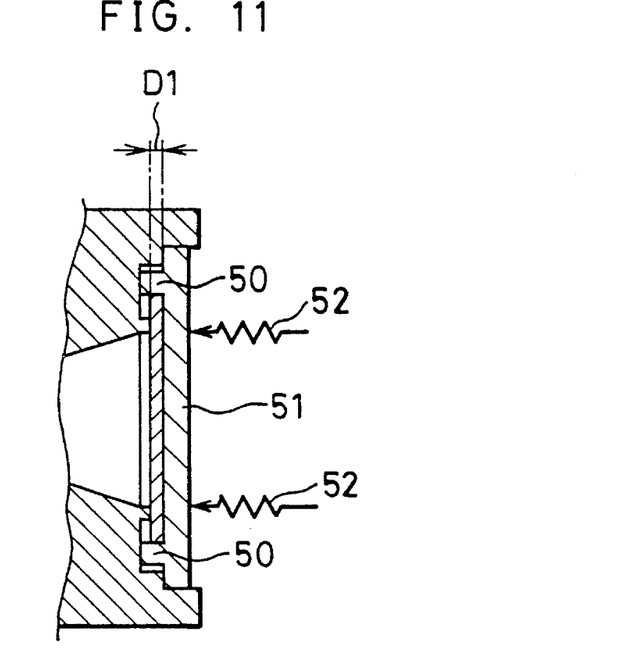
FIG. 11 is a cross section illustrating an important section of a camera embodied to have compressible pins.
Figure 12:
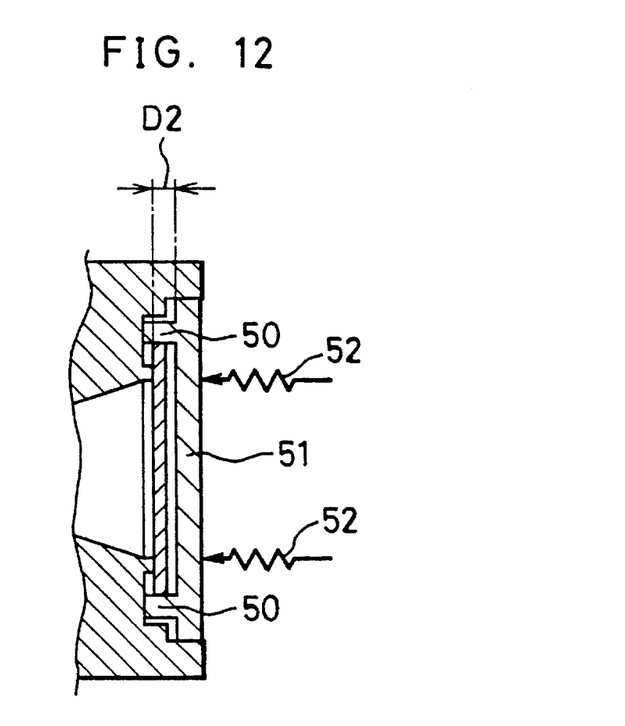
FIG. 12 is a cross section illustrating the same, in which the film is moved.

In the above camera 35, the film support plate 4 is fixed on the exposure frame 3 on the camera body 2. The film tunnel is formed between the plate 4 and the camera body 2 for passage of the film 15. The film tunnel not only smooths movement of the film 15 but also flattens the film 15 reliably. It is preferable to thicken the film tunnel in photography (for better positioning) and to thin the film tunnel in film movement (for lower friction in movement), in the direction of the thickness of the film. As illustrated in FIGS. 11 and 12, a film support plate 51 is provided with at least four pins 50. A spring 52 biases the film support plate 51, and causes the ends of the pins 50 to contact the exposure frame 30. The length of the pins 50 is changeable, because the pins 50 are associated with an electromagnetic structure or the like such as a magnetostrictive element, an electrostrictive element, a voice coil, or a bimetallic element. During photography, the pins 50 are shortened as illustrated in FIG. 11 to set the film tunnel as thin as D1. During the film movement, the pins 50 are lengthened as illustrated in FIG. 12 to set the film tunnel as thick as D2.

In the above embodiment, the magnetic head 5 writes data. Further, the magnetic head 5 can read data, such as film sensitivity, previously stored in the film 15. In the above embodiment, the inspecting magnetic tape 31 is used to inspect the mounting precision of the magnetic head 5. Alternatively, inspecting photo film 15 with data stored in the recording layer may be used to inspect the mounting precision of the magnetic head 5.

In the above embodiment, the four pins 20a, 20b, 21a and 21b are used. Instead, a different number of pins, e.g., six or eight pins, may be used. In the above embodiment, the pins are integral with the film support plate 4. Alternatively, pins may be fixed by screws, or adhered by adhesive, to the film support plate 4. Instead of the pins above, two ridges may be formed on the film support plate 4 in an arrangement similar to the inner rails 25a and 25b. Each of such ridges can have a single pin for being positioned, and fitted in a hole formed in the exposure frame 3. Further, instead of the pins described above, four blocks may be formed on the film support plate 4 to extend horizontally.

The film support plate 4 may further have at least two pins, which may be fitted in holes in a frame of the magnetic head 5, for the purpose of positioning magnetic head 5. It is possible to support the magnetic head 5 by use of a spring plate, or the like, to be shiftable in the direction of the optical axis, for the purpose of stabilizing pressure of contact between the magnetic head 5 and the recording layer.

In the above embodiment, the camera is adapted to the cassette of a type in which the film leader is advanced in response to rotation of the spool. However, the present invention is applicable to a camera adapted to a cassette which contains the photo film with the magnetic recording layer and otherwise is the same as a conventional 135-type photo film cassette. Such a variant camera may consist of a camera body and a back door disposed behind the camera body in openable fashion, and a film leader while protruded from the cassette may be inserted in a path between the opened back door and the camera body. A film support plate may be mounted on the back door. Note that, when a camera embodying the present invention is adapted to the leader-advancing cassette, it is desirable for the camera to have a back door for the purpose of facility in repair or maintenance. Such back door may be opened ordinarily to such a smaller degree as to cause only the cassette containing chamber to appear, and may be opened to a greater degree when the camera requires repairing. The back door may be provided with the film support plate mounted thereon.

Although the present invention has been fully described by way of the preferred embodiments thereof with reference to the accompanying drawings, various changes and modifications will be apparent to those having skill in this field without departing from the scope of the present invention, as defined by the appended claims.

What is claimed is:

1. A camera having an exposure frame in which an exposure aperture is defined, a film support plate disposed behind said exposure frame for supporting a rear surface of photo film, and a magnetic head mounted on said film support plate, said film moving through a passageway defined between said exposure frame and said film support plate, a magnetic recording layer formed on said film to allow data to be recorded on, or read from, said recording layer, during movement of said film, by said magnetic head, said camera comprising position regulating means for regulating the position of longitudinal edges of said film, said regulating means being disposed on said film support plate, wherein said film support plate is fixed to said exposure frame.

2. A camera as defined in claim 1, wherein said regulating means comprises two pairs of pins, and said longitudinal edges are respectively associated with one of said pairs.

3. A camera as defined in claim 2, wherein recesses are formed in said film support plate around respective ones of said pins.

4. A camera as defined in claim 3, wherein said exposure frame has a pair of inner rails formed along said exposure aperture, and a pair of outer rails formed outside said inner rails and having a height which is greater than said inner rails, a rear face of said inner rails receives a front surface of said film, a rear face of said outer rails contacts sides of said film support plate, and an interval between said outer rails is greater than an interval between said four pins in a width-wise direction of said film.

5. A camera as defined in claim 4, wherein said exposure frame further comprises four positioning holes in which said four pins are fitted respectively, and said holes are formed to extend to a horizontal face of said outer rails.

6. A camera having an exposure frame in which an exposure aperture is defined, a film support plate disposed behind said exposure frame for supporting a rear surface of photo film, and a magnetic head mounted on said film support plate, said film moving through a passageway defined between said exposure frame and said film support plate, a magnetic recording layer formed on said film to allow data to be recorded on, or read from, said recording layer, during movement of said film, by said magnetic head, said camera comprising:

a fixing member for fixing said film support plate on said exposure frame;

at least first, second, third, and fourth pins for regulating a position of longitudinal edges of said film, said first and second pins being disposed on a first side of said exposure aperture with respect to a direction of movement of the film to define a first distance therebetween, and said third and fourth pins being disposed on a second side of said exposure aperture with respect to the direction of movement to define said first distance therebetween, wherein said exposure frame has four positioning holes formed therein in which said four pins are fitted respectively, said positioning holes are formed to extend to a horizontal face of said outer rails.

7. A camera as defined in claim 6, wherein said exposure frame has a pair of inner rails formed along said exposure aperture, and a pair of outer rails formed outside said inner rails and provided having a height which is greater than said inner rails, a rear face of said inner rails receives a front surface of said film, a rear face of said outer rails contacts sides of said film support plate, and an interval between said outer rails is slightly greater than said first distance.

8. A camera as defined in claim 6, wherein recesses are formed in said film support plate around respective ones of said first to fourth pins.

9. A camera as defined in claim 6, wherein said first and third pins are cylindrical, and said second and fourth pins have a flat face which contacts said film.

10. A camera as defined in claim 9, wherein said film support plate has an opening formed therein and adapted to insertion of a jig device having an inclined end face, and said jig device pushes up a magnetic tape while the tape is moved in contact with said magnetic head, so as to cause one longitudinal edge of said magnetic tape to contact said flat face of said second and fourth pins, said magnetic tape being used for inspection of a reading or writing operation of said magnetic head.

11. A camera having an exposure frame in which an exposure aperture is defined, a film support plate disposed behind said exposure frame for supporting a rear surface of photo film, and a magnetic head mounted on said film support plate, said film moving through a passageway defined between said exposure frame and said film support plate, a magnetic recording layer formed on said film to allow data to be recorded on, or read from, said recording layer, during movement of said film, by said magnetic head, said camera comprising:

at least first, second, third, and fourth pins for regulating a position of longitudinal edges of said film, said first and second pins being disposed on a first side of said exposure aperture with respect to a direction of movement of the film to define a first distance therebetween, and said third and fourth pins being disposed on a second side of said exposure aperture with respect to the direction of movement to define said first distance therebetween;

a securing member coupled to said film support plate and said exposure frame for securing said film support plate to said exposure frame;

wherein said exposure frame has a pair of inner rails formed along said exposure aperture, and a pair of outer rails formed outside said inner rails and provided having a height which is greater than said inner rails, a rear face of said inner rails receives a front surface of said film, a rear face of said outer rails contacts sides of said film support plate, and an interval between said outer rails is slightly greater than said first distance.

12. A camera having an exposure frame in which an exposure aperture is defined, a film support plate disposed behind said exposure frame for supporting a rear surface of photo film, and a magnetic head mounted on said film support plate, said film moving through a passageway defined between said exposure frame and said film support plate, a magnetic recording layer formed on said film to allow data to be recorded on, or read from, said recording layer, during movement of said film, by said magnetic head, said camera comprising:

at least first, second, third, and fourth pins for regulating a position of longitudinal edges of said film, said first and second pins being disposed on a first side of said exposure aperture with respect to a direction of movement of the film to define a first distance therebetween, and said third and fourth pins being disposed on a second side of said exposure aperture with respect to the direction of movement to define said first distance therebetween, wherein recesses are formed in said film support plate around respective ones of said first to fourth pins.

13. A camera having an exposure frame in which an exposure aperture is defined, a film support plate disposed behind said exposure frame for supporting a rear surface of photo film, and a magnetic head mounted on said film support plate, said film moving through a passageway defined between said exposure frame and said film support plate, a magnetic recording layer formed on said film to allow data to be recorded on, or read from, said recording layer, during movement of said film, by said magnetic head, said camera comprising:

at least first, second, third, and fourth pins for regulating a position of longitudinal edges of said film, said first and second pins being disposed on a first side of said exposure aperture with respect to a direction of movement of the film to define a first distance therebetween, and said third and fourth pins being disposed on a second side of said exposure aperture with respect to the direction of movement to define said first distance therebetween, wherein said first and third pins are cylindrical, and said second and fourth pins have a flat face which contacts said film.

14. A camera as defined in claim 13, wherein said film support plate has an opening formed therein, said opening being adapted to insertion of a jig device having an inclined end face, and said jig device pushes up a magnetic tape while the tape is moved in contact with said magnetic head, so as to cause one longitudinal edge of said magnetic tape to contact said flat face of said second and fourth pins, said magnetic tape being used for inspection of a reading or writing operation of said magnetic head.

15. A camera having an exposure frame in which an exposure aperture is defined, a film support plate disposed behind said exposure frame for supporting a rear surface of photo film, and a magnetic head mounted on said film support plate, said film moving through a passageway defined between said exposure frame and said film support plate, a magnetic recording layer formed on said film to allow data to be recorded on, or read from, said recording layer, during movement of said film, by said magnetic head, said camera comprising:

at least first, second, third, and fourth pins for regulating a position of longitudinal edges of said film, said first and second pins being disposed on a first side of said exposure aperture with respect to a direction of movement of the film to define a first distance therebetween, and said third and fourth pins being disposed on a second side of said exposure aperture with respect to the direction of movement to define said first distance therebetween;

biasing means for biasing said first, second, third, and fourth pins to cause distal ends of said first, second, third, and fourth pins to contact said exposure frame; and means for causing said first, second, third, and fourth pins to become longer in a length direction thereof to increase a thickness of said passageway while said film is moved.

\* \* \* \* \*